(12) United States Patent
Hronyetz

(10) Patent No.: US 8,820,756 B2
(45) Date of Patent: Sep. 2, 2014

(54) CARRIER FOR TRANSPORTING BULKY, RELATIVELY HEAVY OBJECTS

(71) Applicant: Albert L. Hronyetz, New Kensington, PA (US)

(72) Inventor: Albert L. Hronyetz, New Kensington, PA (US)

(*) Notice: Subject to any disclaimer, the term of this patent is extended or adjusted under 35 U.S.C. 154(b) by 0 days.

(21) Appl. No.: 13/742,293

(22) Filed: Jan. 15, 2013

(65) Prior Publication Data
US 2014/0077477 A1   Mar. 20, 2014

Related U.S. Application Data

(60) Provisional application No. 61/744,043, filed on Sep. 18, 2012.

(51) Int. Cl.
*B62B 3/06* (2006.01)
*B62B 3/00* (2006.01)
*B62B 3/02* (2006.01)

(52) U.S. Cl.
CPC ........................................ *B62B 3/02* (2013.01)
USPC ............... 280/47.34; 280/47.131; 280/47.24; 280/47.27; 280/43.1

(58) Field of Classification Search
USPC .......... 280/47.131, 47.17, 47.2, 47.23, 47.24, 280/47.27, 47.34, 47.41, 43, 43.1, 43.11, 280/43.16, 43.17
See application file for complete search history.

(56) References Cited

U.S. PATENT DOCUMENTS

| | | | | | |
|---|---|---|---|---|---|
| 380,335 | A | * | 4/1888 | Manfred | 280/46 |
| 672,152 | A | * | 4/1901 | Ruher | 280/5.32 |
| 1,100,702 | A | * | 6/1914 | Holmes | 280/43.24 |
| 1,887,134 | A | * | 11/1932 | Johancen | 280/43.16 |
| 2,243,915 | A | * | 6/1941 | Mueller | 280/5.32 |
| 2,361,674 | A | * | 10/1944 | Zeindler | 254/3 C |
| 2,491,780 | A | * | 12/1949 | Stees | 298/11 |
| 2,563,919 | A | * | 8/1951 | Christensen | 280/43.18 |
| 2,605,117 | A | * | 7/1952 | Hooz et al. | 280/43 |
| 2,818,988 | A | * | 1/1958 | Dunkin | 414/457 |
| 3,191,786 | A | * | 6/1965 | Langrell | 414/444 |
| 3,363,787 | A | * | 1/1968 | Macomber | 414/444 |
| 3,655,212 | A | * | 4/1972 | Krass et al. | 280/641 |
| 3,687,475 | A | * | 8/1972 | Wiczer | 280/641 |
| 3,693,996 | A | * | 9/1972 | Hardy | 280/47.34 |
| 4,091,942 | A | * | 5/1978 | Shelton | 414/742 |
| 4,122,958 | A | * | 10/1978 | Thayer | 414/373 |
| 4,136,888 | A | * | 1/1979 | Bowie et al. | 280/5.22 |
| 4,639,004 | A | * | 1/1987 | Maeda et al. | 280/5.32 |
| 4,681,330 | A | * | 7/1987 | Misawa | 280/47.2 |
| 4,728,245 | A | * | 3/1988 | Shelton | 414/490 |
| 4,737,065 | A | * | 4/1988 | Ju | 414/490 |
| 4,919,442 | A | * | 4/1990 | Green | 280/43.1 |
| 5,120,183 | A | * | 6/1992 | Phillips | 414/490 |
| 5,160,153 | A | * | 11/1992 | Zan | 280/43.1 |
| 5,390,389 | A | * | 2/1995 | Rutkowski et al. | 15/104.33 |
| D412,044 | S | * | 7/1999 | Deal | D34/12 |
| 5,947,492 | A | * | 9/1999 | Hallberg, Jr. | 280/47.24 |
| 6,341,788 | B1 | * | 1/2002 | Ciccone | 280/47.28 |
| D538,998 | S | * | 3/2007 | Henry | D34/23 |
| 7,628,408 | B2 | * | 12/2009 | Kolesa et al. | 280/47.29 |
| 8,151,934 | B2 | * | 4/2012 | Kirby | 182/63.1 |
| 8,360,444 | B2 | * | 1/2013 | Colacecchi | 280/47.2 |
| 2013/0043663 | A1 | * | 2/2013 | Mitchell et al. | 280/47.18 |

* cited by examiner

*Primary Examiner* — J. Allen Shriver, II
*Assistant Examiner* — Travis Coolman
(74) *Attorney, Agent, or Firm* — Andrew Alexander

(57) ABSTRACT

A carrier for transporting bulky, relatively heavy goods, the carrier capable of being operated by a single individual.

17 Claims, 11 Drawing Sheets

CARRIER FOR TRANSPORTING BULKY, RELATIVELY HEAVY OBJECTS

CROSS REFERENCE TO RELATED APPLICATION

This application claims the benefit of U.S. Provisional Application No. 61/744,043, filed Sep. 18, 2012, incorporated herein by reference.

BACKGROUND OF THE INVENTION

This invention relates to carriers that can be used by a single individual, the carrier suitable for carrying, for example, large, heavy coolers having dimensions such as 9' high, 5' wide and 12' deep. Normally, such coolers require three or four people to move them, not only requiring long times for delivery or pickup, but at a substantial cost.

Dollies for moving objects are disclosed in the art. For example, U.S. Pat. No. 5,938,217 discloses a load handling dolly (1) assists in the transportation of a load P, such as a piano. A pair of cross-pieces (11, 12) are selectively slid beneath the load, either directly or using an intermediate support plate (17). A pair of side frames (3, 4) are disposed on either side of the load above free ends of the cross-pieces. The cross-pieces are received within extremities or eyelets (13b) of tie rods (13a) which are supported by the side frames for vertical movement by rotating a nut (15). As the nuts are turned, the tie rods, cross-pieces, and the load are lifted, transferring the load to two sets of wheels (5, 6, 7; 8, 9, 10) that rotatably mounted in the side frames.

Thus, there is a great need for a carrier which can be used by a single person to load, transport or unload large bulky objects such as coolers and the like.

SUMMARY OF THE INVENTION

It is an object of the invention to provide a carrier suitable for transporting or carrying large or heavy objects.

It is another object of the invention to provide a carrier capable of crossing curb stones while carrying large objects such as coolers.

Still, it is another object to provide a carrier capable of transporting large objects through doorways, even if the height of the object is higher than the door, the carrier managed by a single person.

And still, it is another object of the invention to provide a carrier capable of transferring objects through a doorway wherein the width of the object is wider than the doorway, the carrier handled by a single person.

Thus, it will be seen that there is a great need for a carrier which can be operated by a single individual to move or deliver bulky, relatively heavy objects or goods. The present carrier can be used to move an unlimited amount or kinds of goods, including bales of cotton, bundles of tires, household furniture, stacks of wood, or boards.

In accordance with these objects, there is provided a carrier for carrying bulky and relatively heavy objects operable by a single individual. The carrier is comprised of a frame means and means for preventing objects from slipping off the carrier. A handle means secured to the frame means is also provided. A first means is provided for rolling the carrier, the first means located near a first end of frame means. The rolling means on the frame means is located substantially opposite the handle means. A second means is provided for rolling the carrier. The second means is located near a balance point of the carrier, the second means for rolling is attached to the frame means for rolling. A third rolling means is disclosed or used in rolling the carrier in combination with said first and second rolling means. The third rolling means is adapted to move backwards and forwards relative to the first and second rolling means. The third rolling means is attached to the carrier frame by a shaft and is used for elevating the end of the carrier having handle bars. The third rolling means is adapted to be used with the first or second rolling means, or with both.

These and other objects will become apparent from a reading of the specification and claims and an inspection of the drawings appended hereto.

DETAILED DESCRIPTION OF PREFERRED EMBODIMENTS

Figure 1:
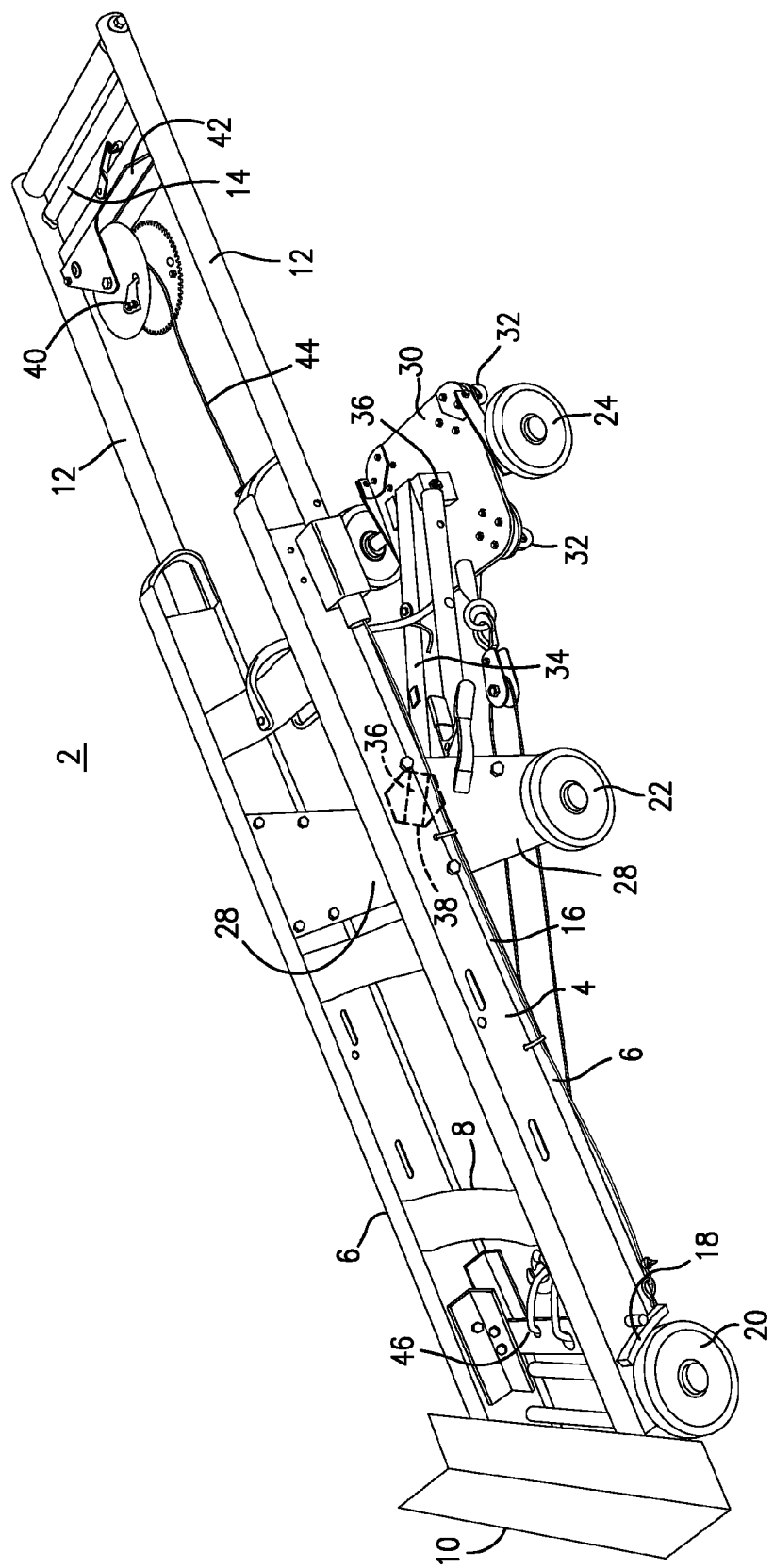
FIG. 1 is a dimensional view of the carrier in accordance with the invention.

In FIG. 1, there is shown a side view in accordance with the carrier of the invention. It will be seen that carrier 2 is comprised of frame 4 which in the embodiment shown, has two rail members 6 joined together by cross bars 8. A ledge or toe plate 10 is provided to ensure against slippage of the object being transported, e.g., cooler. Handles 12 are provided to manipulate the carrier and its load. Near or on handles 12 is positioned a brake bar 14 which in the embodiment shown operates cable 16 to slow or stop the carrier. Brake 18 is shown operating on front wheels 20.

The carrier is provided with three sets of wheels—front wheels 20, pivotal wheels 22 and rear wheels 24. When loaded, the carrier is designed to run on at least one or two pairs of wheels or their equivalent. Front wheels 20 are rigidly attached to rails 6, as shown. Pivotal wheels 22 in this embodiment are mounted on extensions 28 and, for purposes of this embodiment, are fixed in place.

Rear wheels 24 are fixably attached to plate 30 but can be operated to snap upwardly, permitting plate 30 to be carried on casters 32. Casters 32 permit the carrier to be easily steered or directions changed with very little effort. Plate 40, which carries wheels 24 and casters 32, is rotatably connected to shaft 34 by bolt 36, and in the present invention, four casters 32 are used. Shaft 34 is also rotatably connected to frame 4 at point 36 by bar 38. This permits the carrier comprising frame 4 along with handle bars 6 to be raised towards the vertical as desired and as shown in FIG. 2, for example.

The raising or lowering of carrier 2 is accomplished by a wench 40 which is mounted on bracket 42. A cable 44 extends to bracket 46 where it is passed around a first pulley 45A and then to plate 30 where the cable is passed through a second pulley 45B (FIG. 2). Thus, wench 40 can be turned to pull or wind up cable 44. Wheels 24 are pulled towards wheels 20. Wheels 22 will eventually leave the ground (see FIG. 2). Thus, the carrier rests on wheels 20 and 24. The carrier may be raised or lowered in another way. That is, a hydraulic piston (not shown) can be activated to push wheels 22 from the ground. As the hydraulic arm is extended to the ground, wheels 22 are removed and wheels 24 are ratcheted towards wheels 20 (see FIG. 2). Carrier 4 rests on wheels 20 and 24.

Figure 2:
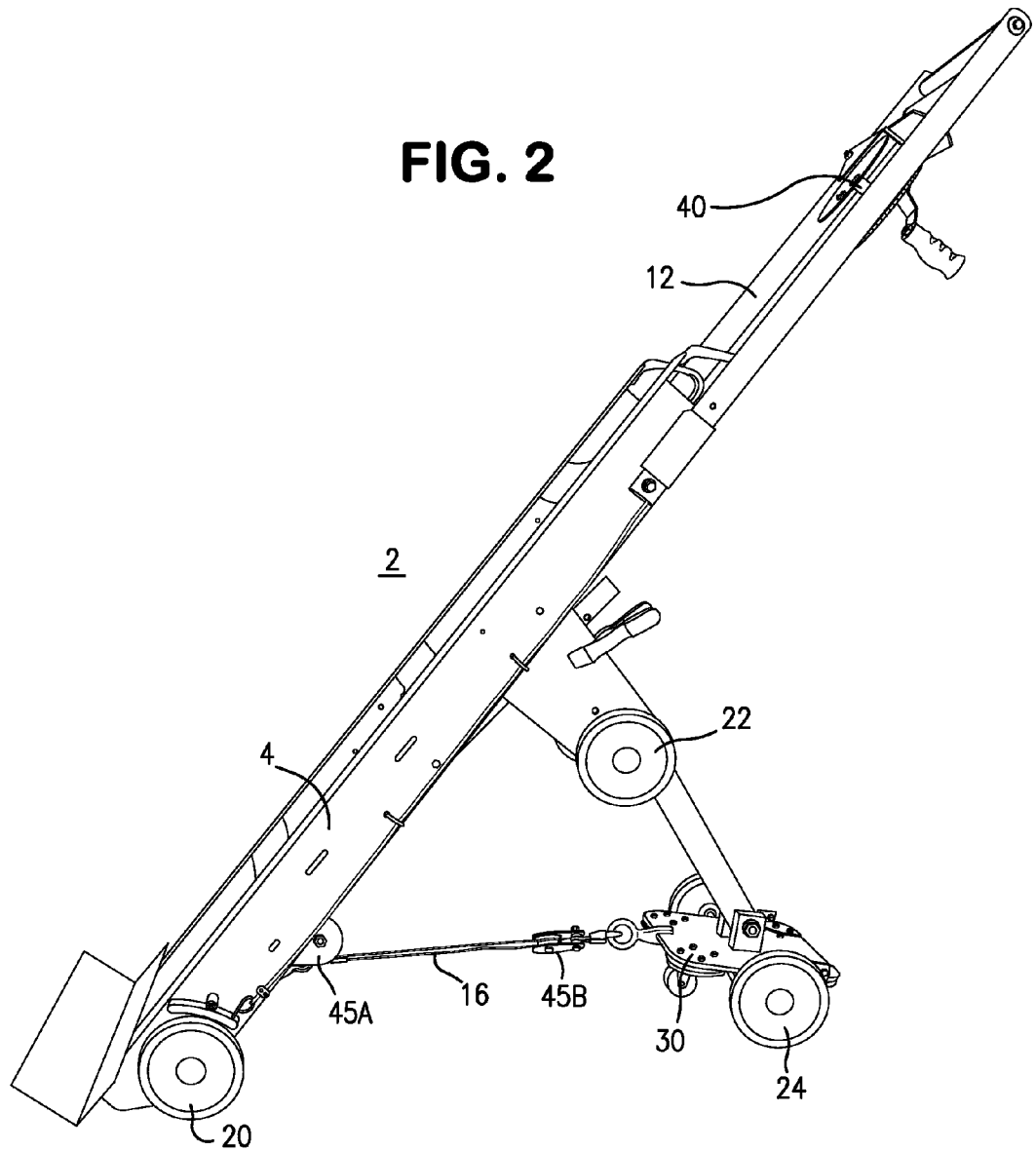
FIG. 2 is a side view of the carrier in approximately the 45° position.

FIG. 2 shows the carrier at approximately 45° from the ground, and two pairs of wheels 20 and 24 are touching or resting on the ground, and wheels 22 are elevated. As wench 40 is wound up, the frame of carrier 4, particularly the end which constitutes the handle bars 12, are about 45° from the ground and only front wheels 20 and rear wheels 24 are touching the ground. Further, it is seen that middle wheels 22 are not touching the ground. As rear wheels 24 are pulled towards front wheels 20 by wench 40 pulling cable 16, the wheel base of the carrier is shortened in this embodiment.

Figure 3:
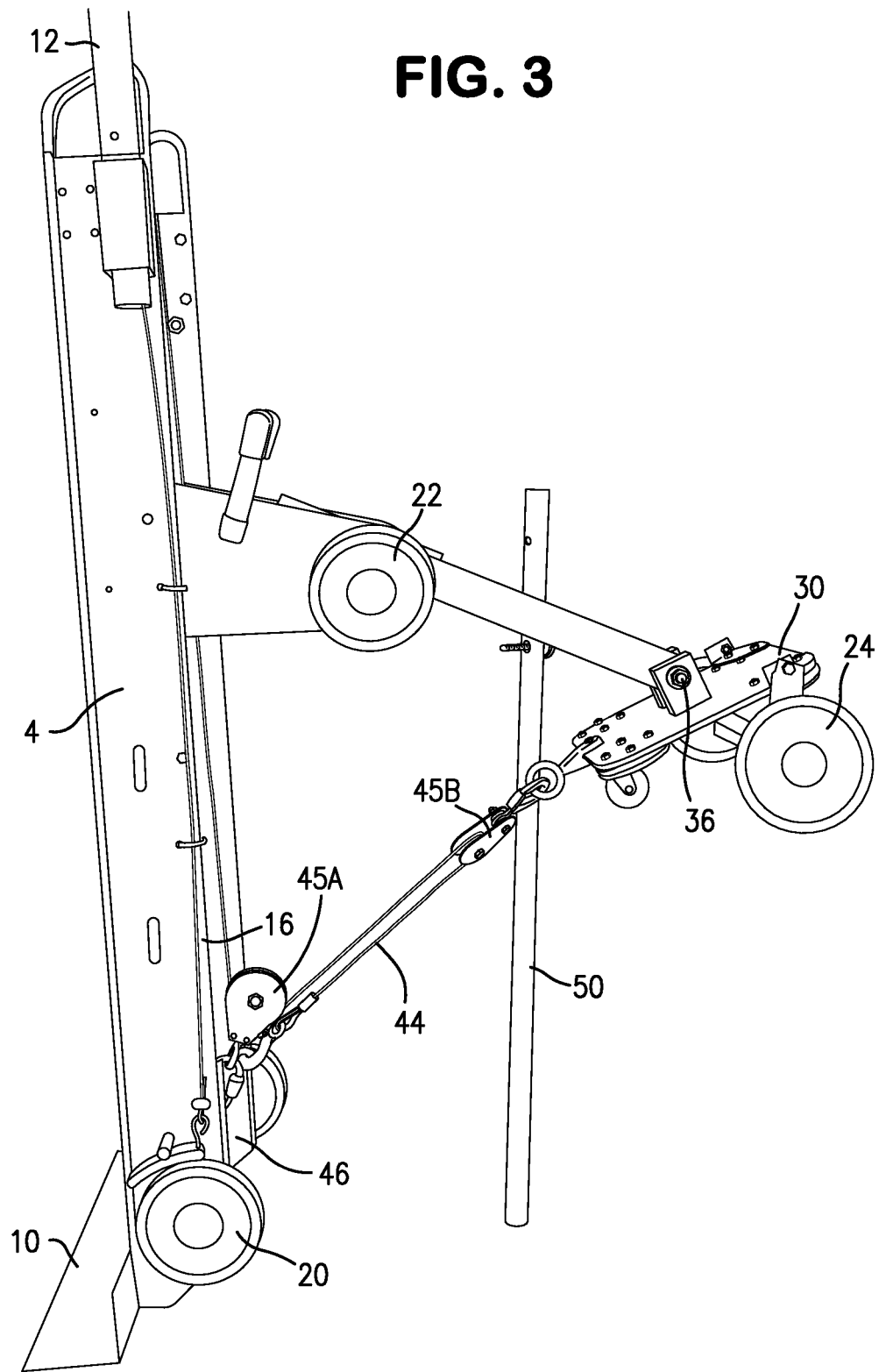
FIG. 3 is a side view showing the carrier in the upright position.

The frame and handle bars of carrier 4 can be raised sufficiently to permit the carrier to reach the vertical as shown in FIG. 3. A support 50 may be provided to ensure the stability of the carrier while a cooler, for example, is loaded for transporting.

Also, FIG. 3 shows that cable 44 pulled tight. It should also be noted that cable 44 is passed around pulley 45A and passed over pulley 45B and joined to bracket 46. This provides a mechanical advantage and thus makes it easier to turn wench 40 when bringing the carrier and load towards the vertical position, as shown in FIG. 3, for example. It will be understood that raising carrier 4 and load from horizontal can be difficult, therefore, having a mechanical advantage is important. Although a single cable may be employed, additional cables 44 may be used to provide further mechanical advantage, i.e., making it easier to raise the load towards the vertical. Additionally, while a cable system is illustrated herein, it will be understood that other systems can be used and are contemplated within the scope of the invention. For example, a screw and ratchet system may be used to raise and lower the carrier and load as illustrated herein. Also, a hydraulic system may be used to raise the carrier and load as shown herein. Alternatively, a combination of such systems may be used or a mechanical lift is contemplated. Such systems may be powered to provide ease of operation and may be run by electricity or powered by an onboard motor. Additionally, such systems can be mounted at different locations on the carrier and such are included herein. Further, other means may be used to raise and lower the end of the carrier as taught herein, and such raising and lowering means are included herein since the concept of raising and lowering is taught herein.

It will be appreciated that the carrier may be powered by an onboard electric or gasoline motor to move it along the sidewalk, for example. Alternatively, a long extension cord may be used. On the onboard system, an electric motor may be powered by an onboard battery. If a gasoline motor is used, it may be connected by means of a belt or chain. Such power may be transferred to wheels 20, 22 or 24 to aid in moving the carrier. This may all be applied and directed by remote control. Thus, the operator can direct the operation.

The wheels may be larger or smaller, depending on the contemplated industry. In addition, the wheels may be of the roller type where a single wheel may be used. Again, this depends on the industry and the contemplated use. All such changes are contemplated within the scope of the invention. In addition, the front wheels may be used to steer the carrier and levers or the like (not shown) may be used for steering purposes. It will be appreciated that smaller diameter wheels facilitate passage through low doorways and in some instances are preferred.

While the carrier is shown comprising two rails joined with brackets, it will be noted that the carrier may comprise a member of rails or even a solid plate having handles to facilitate lifting or lowering the carrier as taught herein. It will be appreciated that the carrier can comprise numerous shapes and form, which are included herein. Further, the rails should be constructed of a light weight metal such as aluminum or a reinforced plastic or other such material to keep the weight of the carrier low. In addition, handle bars 12 can be telescopically mounted to accommodate the load being carried, and as seen in FIG. 1, cloth or wear material 60 may be provided to prevent scraping or scoring the load or equipment being carried.

Step or toe 10 is shown as being fixedly attached to the rails of frame 4. In an embodiment (not shown), step toe 10 may be moved up the frame to carry items having legs and thus require a higher step to rest the body on the carrier.

In FIG. 3, the carrier is standing in the vertical or upright position with wheels off the ground and a support 50 is used to balance the carrier. This is important because large bulky goods, e.g., coolers or freezers, can be loaded by placing over step or toe 10, and this position may be used to secure the cooler to the carrier with a fastening means such as a belt.

Figure 4:
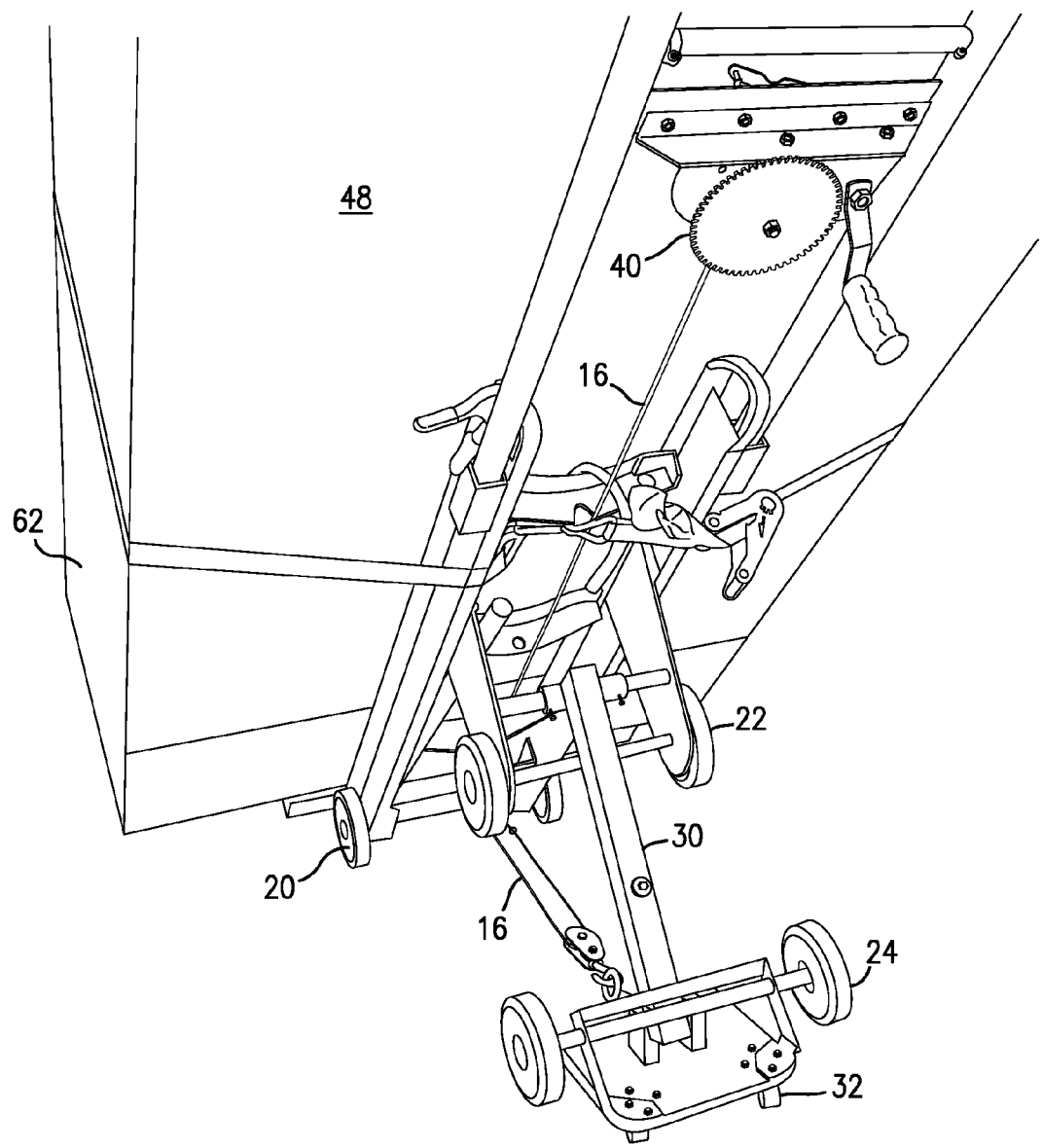
FIG. 4 shows the carrier with a cooler clamped in place, ready for transporting a cooler.

In FIG. 4, carrier 2 is shown carrying a bulky or heavy cooler 48 with a weight of approximately 700 to 800 pounds. In FIG. 4, wheels 22 are removed from the floor. This happens as the cooler and carrier are pushed towards the upright position by wench 40 as it is turned to wind up cable 16, thereby shortening the distance between front wheels 20, which are in the locked condition, and rear wheels 24. In so doing, the carrier and load are pushed towards the upright position by shaft 34 when the shaft pushes on the carrier. It will be appreciated that when the carrier and load reach a certain height, it can tip forward under its own weight.

By reference to FIG. 4, it will be seen that carrier and cooler may be raised or lowered, depending on the doorway or entrance to a building. For example, if the height of the door opening is lower than the height of the cooler but sufficiently wide, the carrier and cooler may be lowered to accommodate the height. In the lowered position, the carrier is very manageable by one person because caster wheels 32 permit steering of the carrier.

If the height of the doorway accommodates the height of the cooler but the width of the doorway is too narrow, then the cooler is placed on the carrier on its side 62 and then passed through the entrance or doorway. All of these operations can be carried out by a single individual.

In another aspect of the invention, the carrier can be operated to climb over a curb or step or a number of steps.

Figure 5:
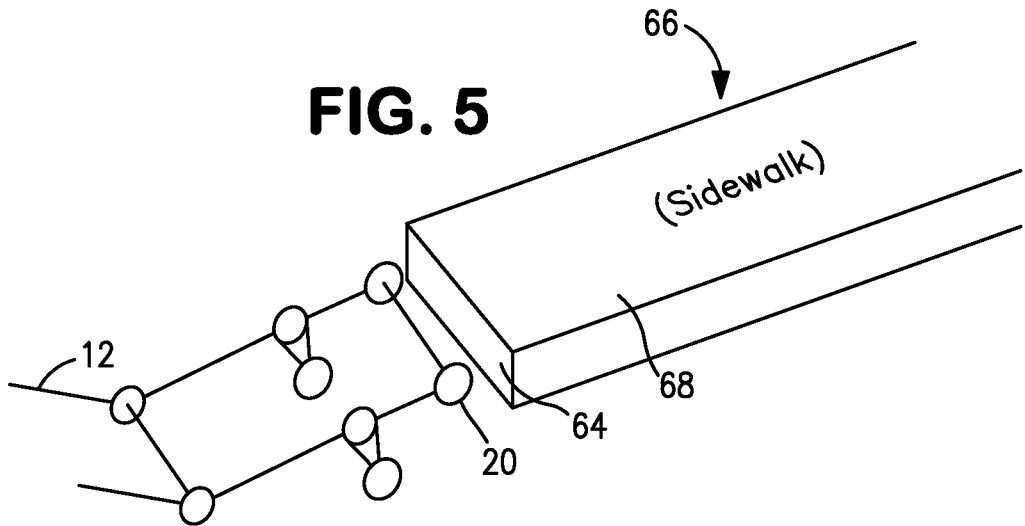
FIG. 5 shows a simplified schematic of the carrier set to climb a step onto the sidewalk.
Figure 6:
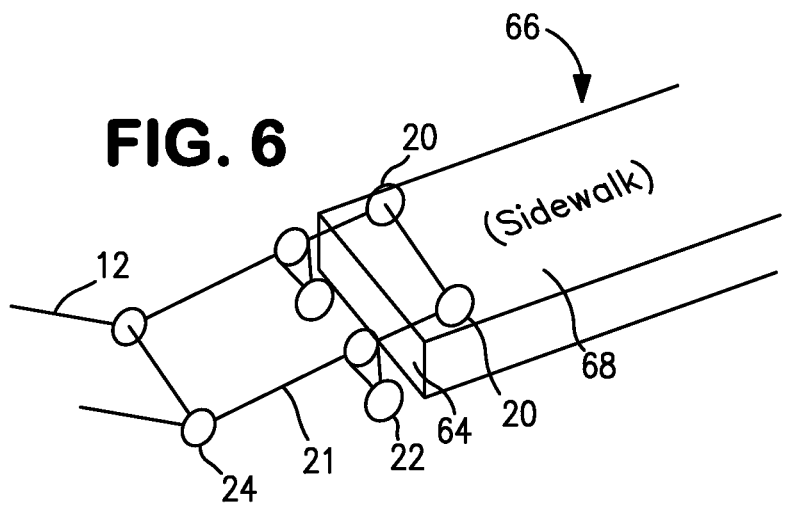
FIG. 6 shows the front two wheels on the sidewalk.

In FIG. 5, there is illustrated the problem of overcoming curbs and steps which would normally require the use of two or three people who would lift or manipulate 800 pounds to get the dolly and load on the sidewalk. Using the present invention, this can be accomplished easily by one person. FIG. 5 shows front wheels 20 in front of step 64, and it is desired to get wheels on sidewalk 66, as shown in FIG. 6. For this procedure, carrier 2 is lowered closely to or approximately to the horizontal. Then weight is applied to handles 12 to raise wheels 20 upwardly above step 64 and then the carrier is moved forward in order for wheels 20 to rest on sidewalk surface 68, as shown in FIG. 6. It should be understood that wheels 22 are located close to the pivot point of the carrier. Accordingly, it does not take a large downward force to raise wheels 20. As wheels 20 are moved onto the sidewalk, the weight of the carrier and load is borne by wheels 22 and 24.

Figure 7:
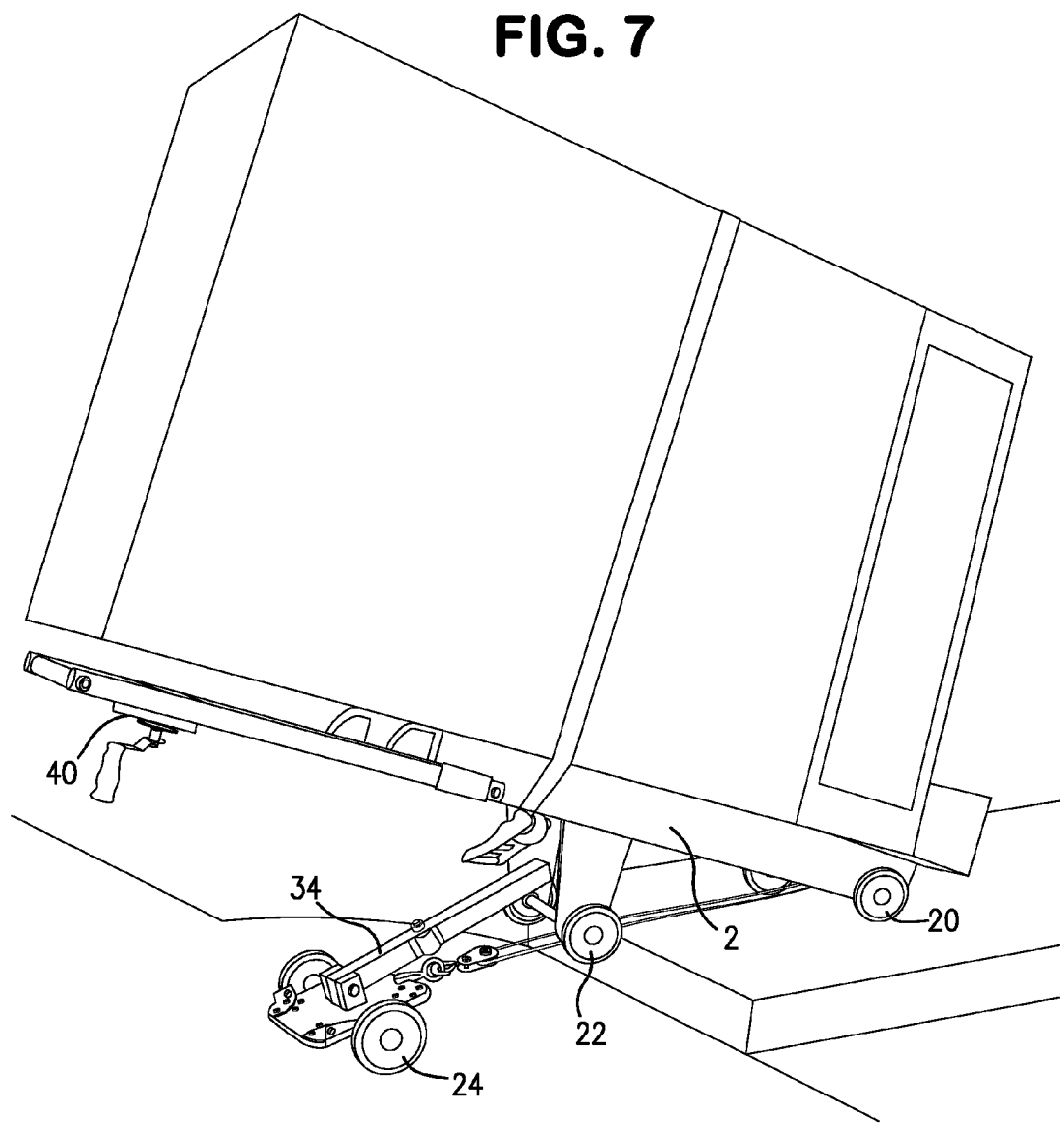
FIG. 7 shows the carrier and load having second pair of wheels ready to move onto the sidewalk.
Figure 8:
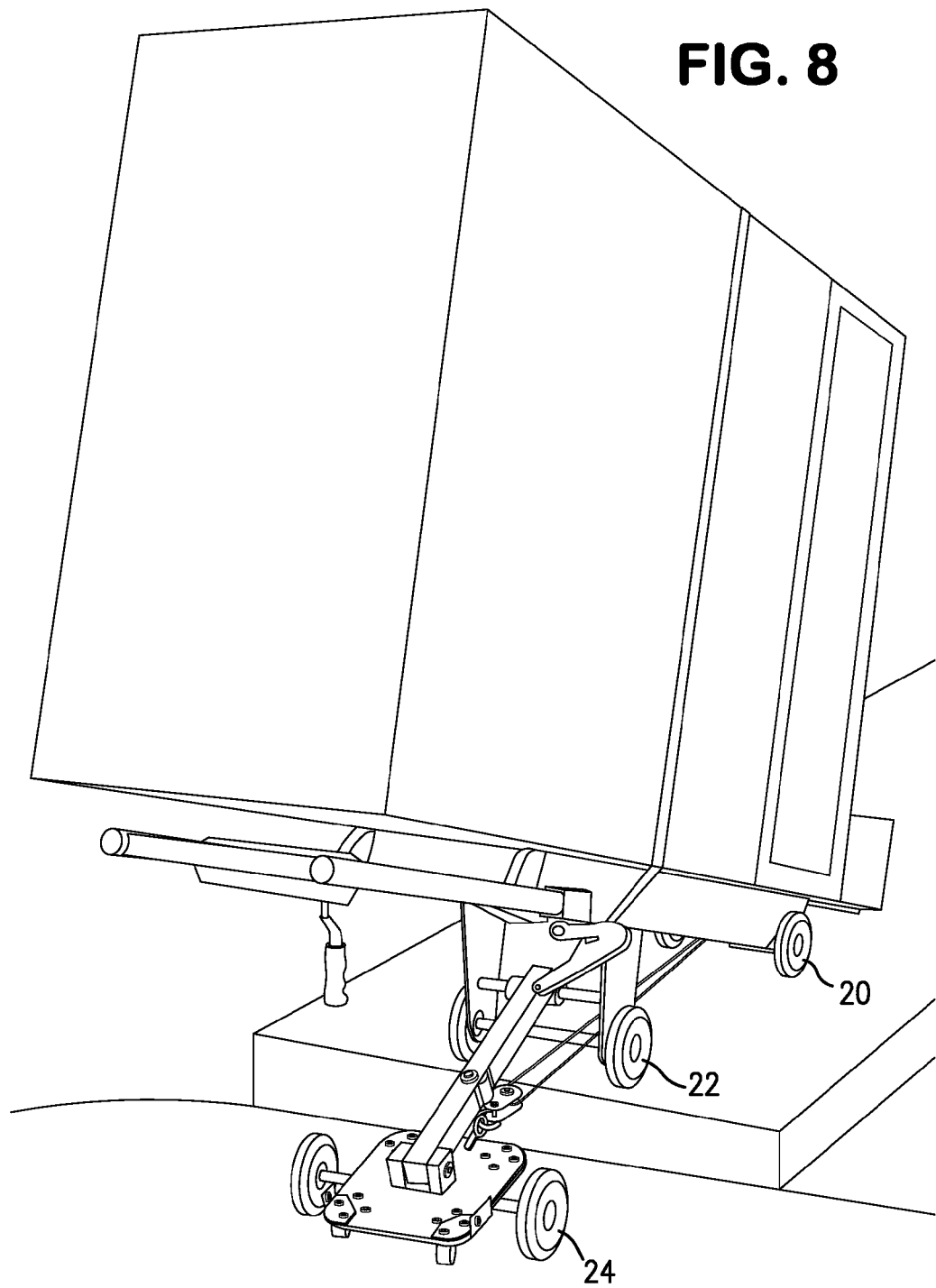
FIG. 8 shows the front and middle wheels on the sidewalk, the third pair of wheels still not on the sidewalk.
Figure 9:
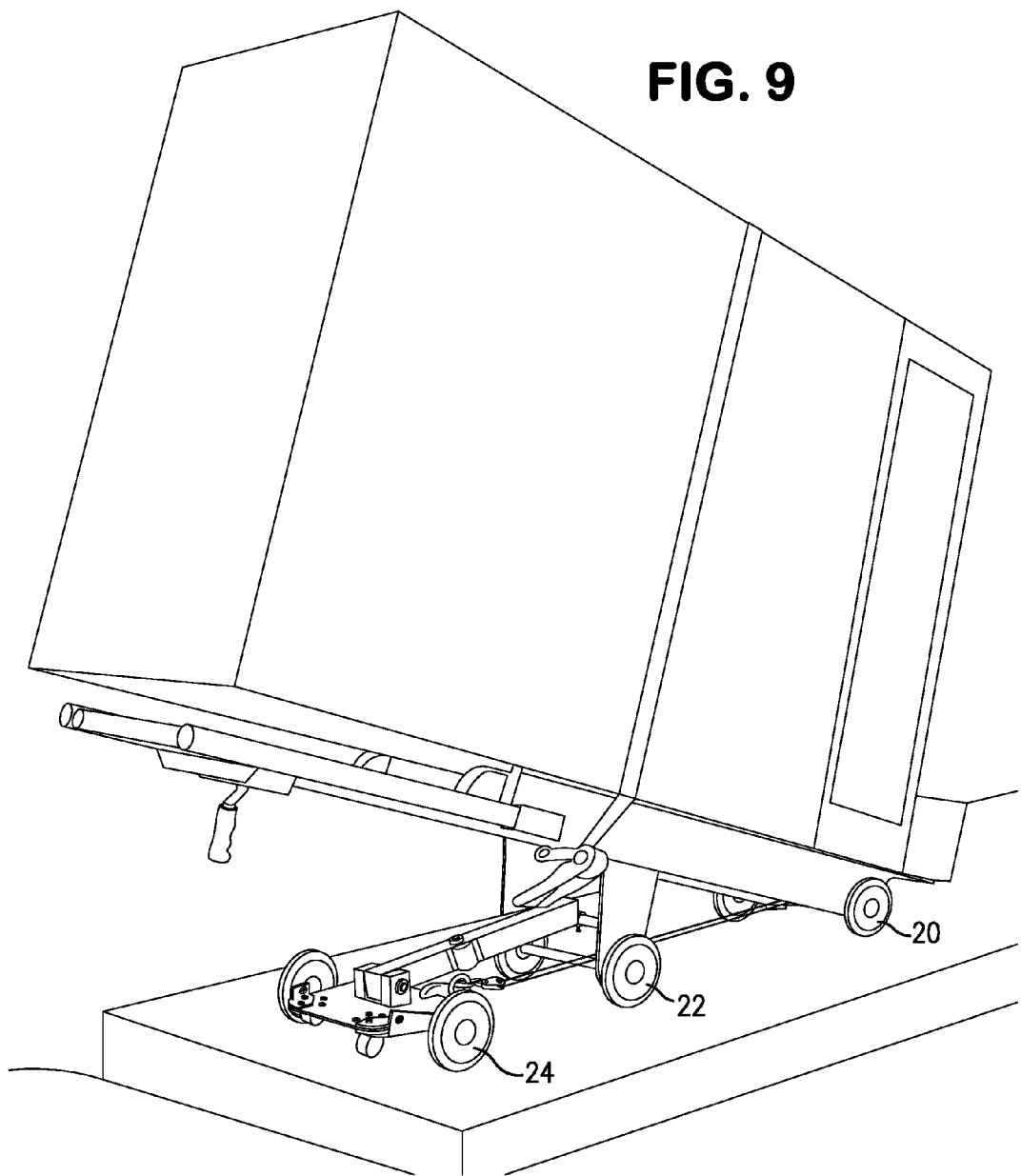
FIG. 9 shows all three pairs of wheels on the sidewalk.

In order to get wheels 22 onto sidewalk surface 68, wench 40 is used. Thus, wench 40 is wound in a direction that will shorten the distance between wheels 20 and 24. This necessarily requires shaft 34 to push upwardly on the carrier, lifting it and wheels 22 above surface 68. The weight now is carried by front and rear wheels 20 and 24 and the carrier and load are pushed onto the sidewalk (see FIG. 7). Next, wheels 22 are lowered to contact the sidewalk and wench 40 is turned in a manner that wheels 24 are lifted upwardly, and the weight of the carrier and load is now borne by wheels 20 and 22. The result of this part of the procedure is shown in FIG. 8. Wheels 24 are raised physically or mechanically, and the carrier and load have successfully mounted the sidewalk, as shown in FIG. 9.

Figure 10:
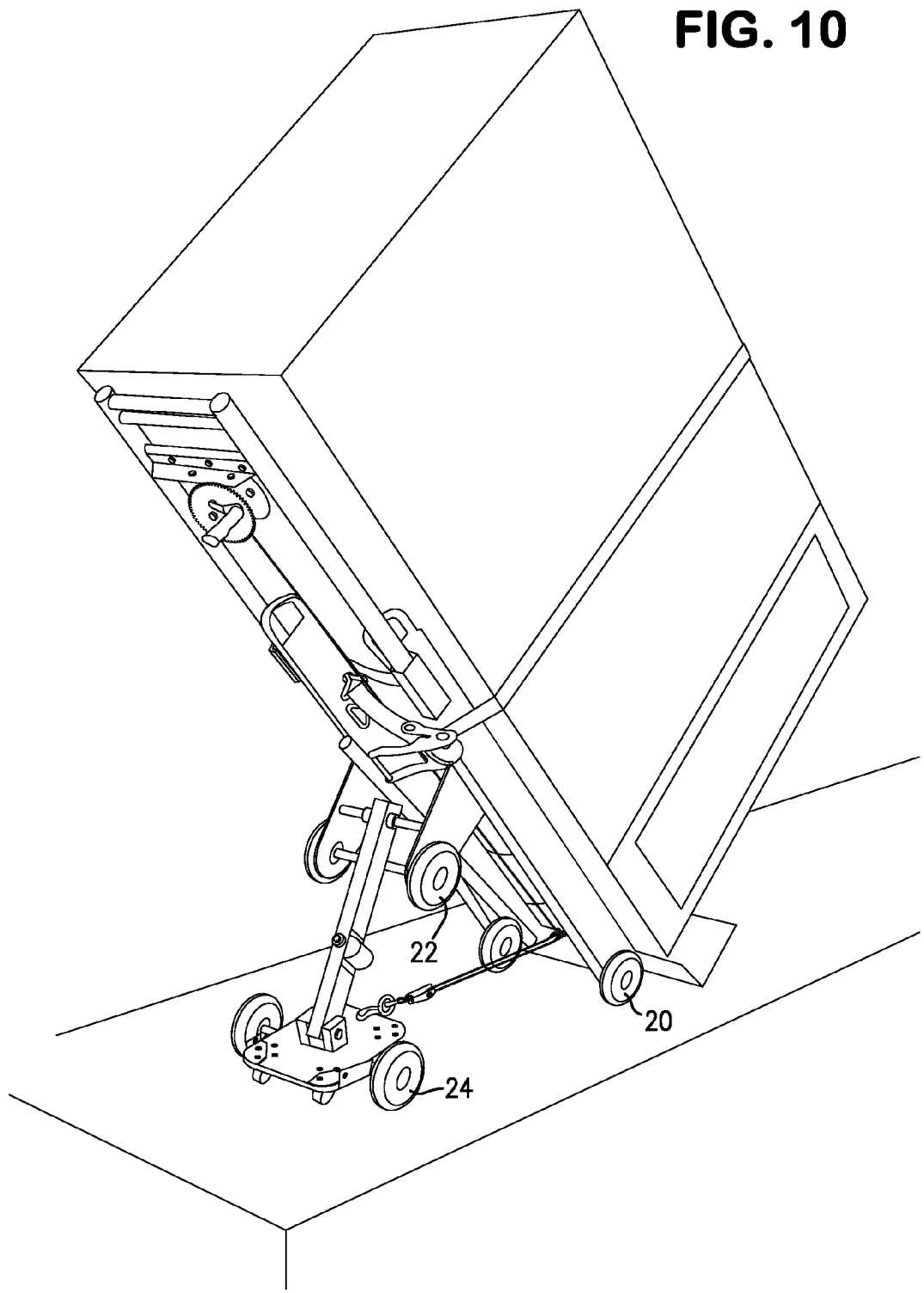
FIG. 10 shows the carrier and load being carried by first and third sets of wheels.
Figure 11:
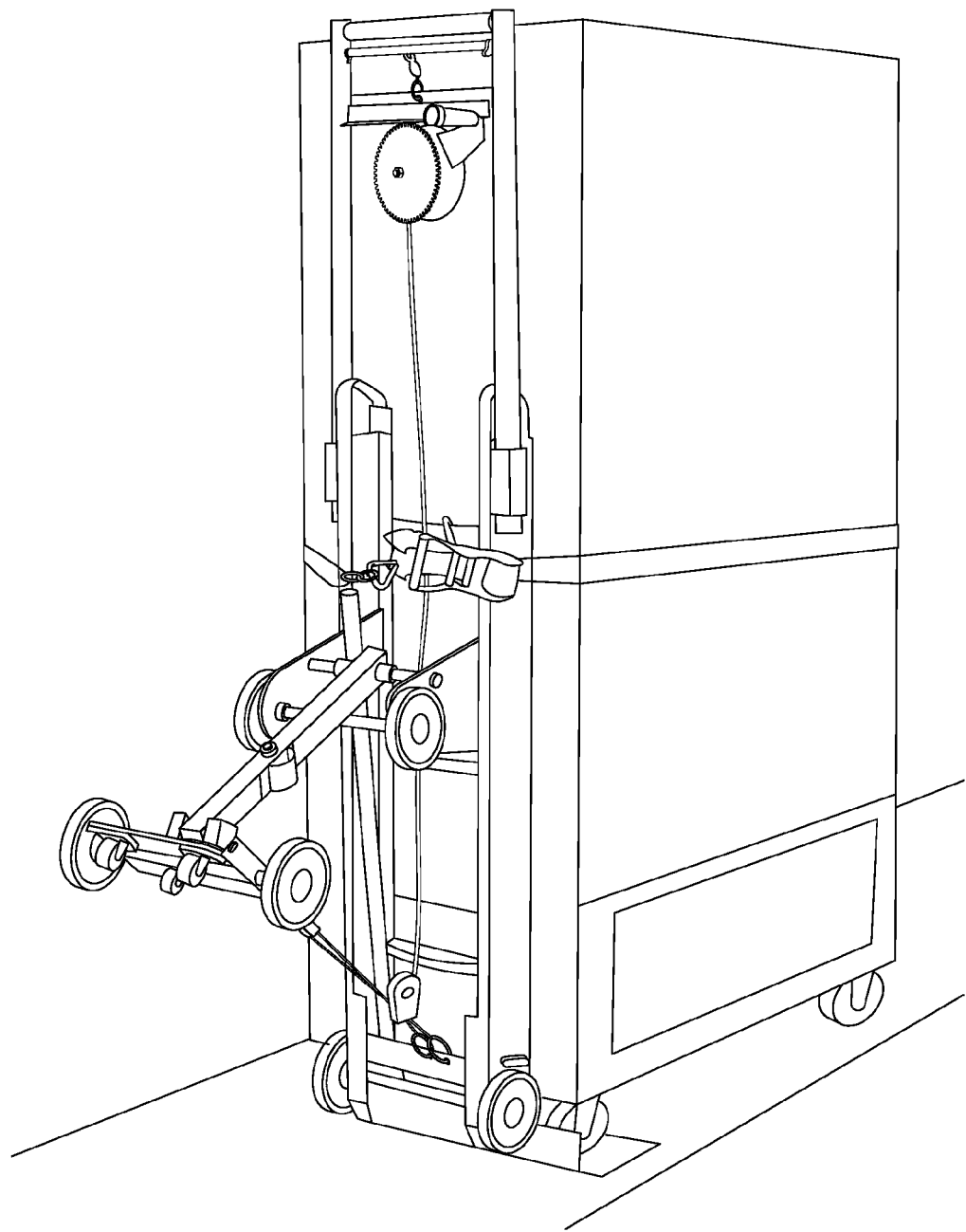
FIG. 11 shows the carrier and load in the fully upright position.

If it is desired to place the cooler in an upright position, wheels 24 are pulled closer to wheels 20 utilizing wench 40. The result of this procedure are shown in FIGS. 10 and 11.

In the present invention, step toe 10 is shown as fixed to rails 6. In another embodiment of this invention, step toe 10 can be moved up rails 6 (not shown) and anchored or fastened thereto as necessary. This is useful when the load to be moved stands on legs.

It will be noted that hydraulic means or screw means may be used to adjust the height of the toe on the rails, as noted. All of these embodiments are contemplated and are considered to be within the scope of the invention.

In yet another embodiment of the invention, extensions 28, which are shown firmly attached to rails 6, can be mounted to rotate or move along rail 6 to better locate the center of gravity. Extension 28 can be longer or shorter and larger wheels may be used with shorter length extensions.

Figure 12:
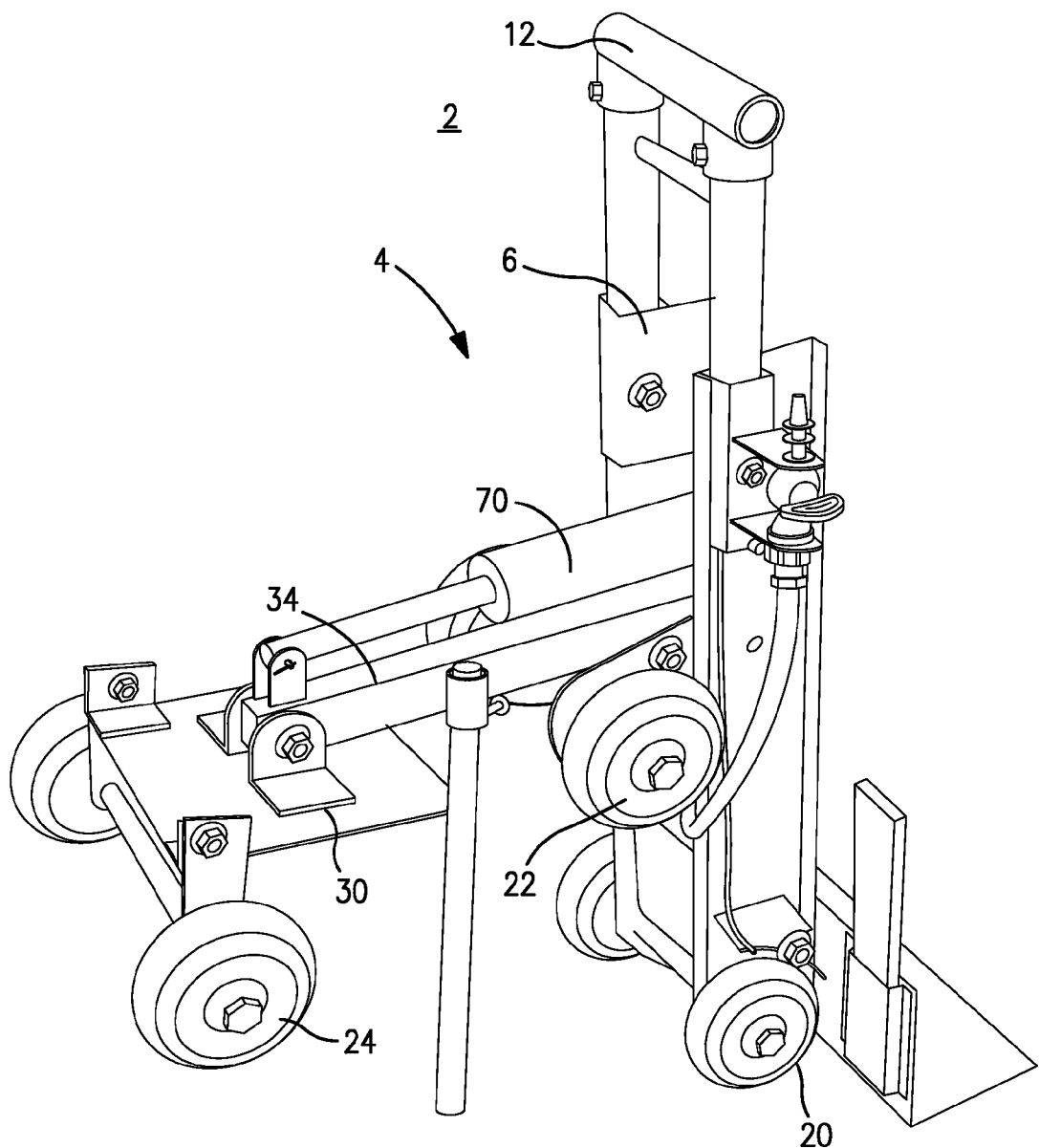
FIG. 12 illustrates alternate means for raising and lowering the carrier.

FIG. 12 illustrates carrier 2 using a cylinder 70 to control the movement of wheels 24 and thus shaft 34 to lift or lower the end of the carrier, as described herein. The cylinder may utilize a gas or liquid, such as air or oil under pressure, to move shaft 34 backwards or forward, thus raising or lowering the handle end of the carrier.

These mechanisms are used to illustrate different methods that can be used on the carrier of the invention. Accordingly, these and other methods are intended to be included with the purview of the invention and claims appended hereto.

Having described the presently preferred embodiments, it is to be understood that the invention may be otherwise embodied within the scope of the appended claims.

What is claimed is:

1. A carrier for carrying bulky and relatively heavy objects operable by a single individual, the carrier comprised of:
   (a) a frame means and means for preventing objects from slipping off the carrier;
   (b) handle means secured to said frame means;
   (c) a first rolling means for rolling said carrier, said first rolling means rigidly attached to a first end of said frame means opposed from said handle means;
   (d) a second rolling means for rolling said carrier, said second rolling means rigidly attached to said frame means at a midpoint of said carrier;
   (e) a third rolling means for rolling said carrier, said third rolling means adapted to move backwards and forwards relative to said first rolling means; and
   (f) elevating means for elevating one end of said carrier having said handle means attached thereto, said elevating means attached to said third rolling means and said frame means.

2. The carrier in accordance with claim 1 wherein said carrier includes rail members fastened to each other by brackets.

3. The carrier in accordance with claim 2 wherein said handle means includes two members held together with brackets, said members fastened to said rail members.

4. The carrier in accordance with claim 1 wherein said elevating means comprises a shaft member rotatably mounted to said frame means and rotatably mounted to a platform, said third rolling means attached to said platform.

5. The carrier in accordance with claim 4 wherein casters are mounted to the underside of said platform.

6. The carrier in accordance with claim 1 wherein said first rolling means includes wheels.

7. The carrier in accordance with claim 1 wherein said second rolling means includes wheels.

8. The carrier in accordance with claim 1 wherein said second rolling means includes two wheels.

9. The carrier in accordance with claim 1 wherein said third rolling means is comprised of wheels.

10. The carrier in accordance with claim 1 wherein said second rolling means is mounted on members mounted to the frame means and project downwardly and have said second rolling means fastened thereto.

11. The carrier in accordance with claim 1 wherein said third rolling means is comprised of two wheels.

12. The carrier in accordance with claim 1 wherein said handle means are adapted to be elevated by moving said third rolling means towards said first rolling means.

13. The carrier in accordance with claim 1 wherein said third rolling means comprises casters.

14. The carrier in accordance with claim 1 wherein said means for elevating one end of the carrier comprises a winch, cable, and a platform, said cable having one end attached to the winch and a second end attached to said platform, said winch adapted to elevate said carrier end by winding up said cable.

15. A carrier for carrying bulky and relatively heavy objects, the carrier comprised of:
   (a) a frame;
   (b) a handle secured to an end of said frame;
   (c) a first set of wheels for rolling said carrier fixably mounted near a first end of said frame opposite said handle;
   (d) a second set of wheels for rolling said carrier, said second set of wheels rigidly attached to said frame at a midpoint of said carrier, said carrier having an underside, said second set of wheels located on the underside of said frame;
   (e) a third set of wheels for rolling said carrier, said third set adapted to move backward and forward relative to said first set of wheels; and
   (f) means for elevating said handle and end of frame to which said handle is attached, said means for elevating said handle comprised of a platform having said third set of wheels fastened thereto and rotatably attached to said frame and adapted to be moved toward said first set of wheels, thereby elevating said handle and end of said frame.

16. The carrier in accordance with claim 15 including a brake means.

17. A carrier for carrying bulky and relatively heavy objects operable by a single individual, the carrier capable of climbing a step, comprised of:
   (a) a frame means and means for preventing objects from slipping off the carrier;
   (b) handle means secured to said frame means;

(c) a first rolling means for rolling said carrier, said first means rigidly attached to a first end of said frame means opposed from said handle means;
(d) a second rolling means for rolling said carrier, said second means rigidly attached to said frame means at a midpoint of said carrier;
(e) a third rolling means for rolling said carrier, said third rolling means adapted to move backwards and forwards relative to said first rolling means;
(f) elevating means for elevating one end of said carrier having said handle means, said means attached to said third rolling means and said frame means; and
(g) brake means for controlling speed of the carrier.

* * * * *